United States Patent [19]

Yamamiya

[11] Patent Number: 4,769,803
[45] Date of Patent: Sep. 6, 1988

[54] OPTICAL INFORMATION RECORDING AND/OR REPRODUCING APPARATUS

[75] Inventor: Kunio Yamamiya, Sagamihara, Japan

[73] Assignee: Olympus Optical Co., Ltd., Tokyo, Japan

[21] Appl. No.: 838,749

[22] Filed: Mar. 11, 1986

[30] Foreign Application Priority Data

Mar. 13, 1985 [JP] Japan .................................. 60-49548

[51] Int. Cl.⁴ .............................................. G11B 7/135
[52] U.S. Cl. ..................... 369/46; 369/112; 350/6.3; 350/245
[58] Field of Search ............................. 369/44, 45, 46; 350/247, 255, 484, 6.3; 250/201, 570

[56] References Cited

U.S. PATENT DOCUMENTS

| | | |
|---|---|---|
| 4,135,083 | 1/1979 | Van Alem et al. ................. 369/45 |
| 4,419,614 | 12/1983 | Kimura . |
| 4,449,213 | 5/1984 | Noborimoto et al. . |
| 4,473,274 | 9/1984 | Yano et al. . |
| 4,479,051 | 10/1984 | Musha . |

FOREIGN PATENT DOCUMENTS

| | | |
|---|---|---|
| 56117337 | 2/1980 | Japan . |
| 57147143 | 3/1981 | Japan . |
| 5984353 | 4/1982 | Japan . |

Primary Examiner—Donald McElheny, Jr.
Attorney, Agent, or Firm—Armstrong, Nikaido, Marmelstein & Kubovcik

[57] ABSTRACT

In order to detect the position of a lens holder held resiliently by a pair of plate springs and fitted with an objective lens, a sensor is fitted in a through hole made in at least one of a pair of permanent magnets enclosing this lens holder and forming a closed magnetic circuit and the position holding the objective lens in a predetermined position is controlled with the output of the above mentioned sensor at the time of starting and ending the movement of the pickup.

11 Claims, 4 Drawing Sheets

OPTICAL INFORMATION RECORDING AND/OR REPRODUCING APPARATUS

FIELD OF THE INVENTION AND RELATED ART STATEMENT

This invention relates to an optical information recording and/or reproducing apparatus wherein a permanent magnet forming a tracking actuator is provided with a position detecting sensor so that a target track may be approached within a short time.

Recently, there has come to be noted an optical information recording and/or reproducing apparatus wherein information is recorded into or reproduced out of a disc-shaped recording medium by light beams without using a magnetic head.

Such optical information recording and/or reproducing apparatus has advantages in that the information can be recorded at such high density that a large amount of information can be contained in a recording medium (such as a disc) of a small diameter and that the information can be read out at a high speed and has a possibility of being able to cope with ever increasing information. There is also an optical information reproducing apparatus solely for reproduction reading out the information recorded at a high density by using light beams.

In the above mentioned optical apparatus using light beams, as it is necessary to read out the information recorded at a high density, the light beams projected onto the disc surface must be set and held in a focus state in which the light beams are collected to be spot-shaped and therefore a focus searching mechanism and auto focus mechanism are used. Also, so that any desired information may be quickly reproduced, there is provided a track seeking mechanism quickly set on a track in which this information is recorded or a tracking servo-mechanism normally held in a predetermined track.

In order to make the above mentioned focus searching or track seeking as disclosed, for example, in the gazette of Japanese patent laid open No. 117337/1981 (U.S. Pat. No. 447,051), an objective lens is made controllable by an (objective lens driving device) actuator. The above mentioned actuator is fitted to an optical pickup movable with a feed motor or the like so that, in the case of seeking the track, usually the optical pickup may be moved in the radial direction of the disc and may be set near a predetermined track to first coarsely seek the track. Then, tracking coils of the actuator are impressed with a signal for a close seeking so that an objective lens supported by parallel plate springs may be moved in the direction vertical to the optical axis to closely seek the track to project light beams onto the predetermined track and, after the end of this close seeking, a tracking servo-mechanism is operated to prevent the light beams from being biased from the predetermined track.

Now, as the above mentioned objective lens is supported by the plate springs, at the time of non-operation when the tracking servo-loop is opened, if the actuator or optical pickup is moved, the objective lens will be vibrated together by the unnecessary vibration produced by the above mentioned plate springs. Therefore, there has been a defect that, in the case of a track seeking, particularly at the time of starting and stopping a course seeking, the above mentioned plate springs will vibrate and the seeking time until a desired track is set will become long.

Further, in the gazette of Japanese patent laid open No. 84353/1984, there is a related art example wherein, when a servo-loop of tracking (driving) coils is open, an objective lens will be held in a predetermined position by the output of a position detecting sensor. In this controlling method, even in case the tracking servo-mechanism is not operating, a close seeking may be made and therefore it will be difficult to smoothly displace the objective lens and, if it is made easy to displace the objective lens, the resiliency will be likely to be short and therefore it will be difficult to hold the objective lens in the set position. For example, as at the time of the end of the coarse seeking, in case a large acceleration acts as in the case that the optical pickup is suddenly stopped, unless a large braking is made to act, the objective lens will vibrate and therefore, in the case of a subsequent close seeking, there will be a trouble. On the other hand, if a large braking is kept acting in order to prevent this vibration, it will be difficult to make such smooth close seeking as is mentioned above. In this related art example, the sensor fitting structure is not referred to and therefore its effect is unknown.

Figure 1:
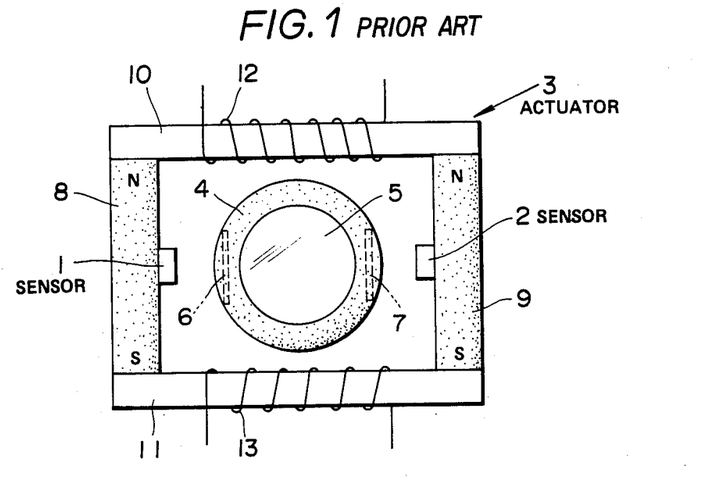
FIG. 1 is a schematic elevation showing the structure of an actuator in the related art example.

Therefore, the present assignee has suggested in the gazette of Japanese patent laid open No. 14714/1982 (U.S. Pat. No. 4,419,614) such related art example having an actuator 3 provided with electromagnetic conversion type sensors 1 and 2 as is shown in FIG. 1.

That is to say, in the actuator 3, an objective lens 5 is fixed to a central magnetic ring 4 which is fitted to one end of each of parallel plate springs 6 and 7 erected in the direction vertical to the paper surface and fixed at the other ends to a moving coil (not illustrated) fixed to a damper (not illustrated) provided below in the direction vertical to the paper surface.

Around the magnetic ring 4 to which the above mentioned objective lens 5 is fitted, a apir of permanent magnets 8 and 9 are provided in parallel with the above mentioned plate springs 6 and 7 so that the magnetizing directions may be directed in the same direction and yokes 10 and 11 are arranged to short-circuit the magnetic poles of the magnets 8 and 9 in the direction intersecting rectangularly with the magnets 8 and 9 so as to form a closed magnetic circuit and are wound respectively with tracking driving coils 12 and 13. Electromagnetic conversion types sensors 1 and 2 are fitted as opposed to each other on the middle insides in the lengthwise direction of the above mentioned permanent magnets 8 and 9.

By the way, the above mentioned plate springs 6 and 7 are separated at the other ends in the direction vertical to the paper surface from the above mentioned magnetic ring 4 and the closed magnetic circuit provided around it. The above mentioned moving coil is inside a magnet not illustrated so that the objective lens 5 may be moved in the direction vertical to the paper surface together with the magnetic ring 4 and others by an electric current flowed through the moving coil to set a focus state.

On the other hand, due to the magnetic flux passing through the pairs of magnets 8 and 9 and yokes 10 and 11 arranged respectively as opposed to each other and the magnetic ring 4 located in the central part of the space enclosed with them, when no current flows through the above mentioned tracking driving coils 12 and 13, the magnetic ring 4 will be in the substantially central position symmetrical in the right and left directions as illustrated but, as the magnetic flux within the yokes 10 and 11 varies in the position in the right and left directions depending on the current flowing through the tracking driving coils 12 and 13, most of the magnetic flux leaking to the magnetic ring 4 side will be replaced in the right and left directions and therefore the magnetic ring 4 will be able to be moved in the right and left directions by this magnetic flux. By setting these right and left directions in the radial direction of the disc, a close seeking or tracking can be made.

Now, by the electromagnetic conversion type sensors 1 and 2 fitted to the inside surfaces of the above mentioned permanent magnets 8 and 9, the vibration of the magnetic ring 4 is detected by the leading magnetic flux and this detected signal is corrected in the phase so that a damping may work only in the resonant frequency range of the mechanical vibration by the plate springs 6 and 7 and damper and has been impressed on the above mentioned tracking driving coils 12 and 13.

Thus, the resonance of the mechanical vibrating system including the objective lens 5 in the actuator 3 has been electrically controlled to realize excellent damping characteristics.

However, in the above mentioned related art example:

(1) The tracking magnetic circuit is so small in the size (that the maximum magnetic flux of the permanent magnets 8 and 9 will be restricted) and the movable magnetic ring 4 is so high in the permeability that the magnetic flux leaking from this magnetic ring 4 to the sensors 1 and 2 side will be so small as to be difficult to detect with the electromagnetic conversion type sensors 1 and 2.

(2) As the leakage of the magnetic flux from the permanent magnets 8 and 9 themselves and from the junctions of the permanent magnets 8 and 9 and yokes 10 and 11 mixes as a noise into the sensors 1 and 2, the SN ratio will deteriorate.

(3) Due to such causes as in the above mentioned (1) and (2), the input and output characteristics of the sensors 1 and 2 will become nonlinear to make it difficult to detect a correct position.

(4) Though the air gaps between the above mentioned magnetic ring 4 and permanent magnets 8 and 9 are required to be larger than the tracking moving range, it will be difficult to fit between them small sensors of a high sensitivity and good linearity and to adjust them to be high in the sensitivity.

As the above mentioned sensor, in such position sensor other than a hole element as, for example, a sensor of an electrostatic capacity, eddy current or photonics, there is a problem that, the smaller the size, the narrower the linear range and the tracking range will not be able to be well covered. Such structure will be a great restriction to providing the sensors within the actuator 3.

OBJECTS AND SUMMARY OF THE INVENTION

An object of the present invention is to provide an optical information recording and/or reproducing apparatus wherein the seeking time can be made small.

Another object of the present invention is to provide an optical information recording and/or reproducing apparatus wherein the seeking time can be made small with a small size and low cost.

According to the present invention, a permanent magnet forming a tracking actuator is provided with a through hole, a position detecting sensor is fitted in the through hole and a means of detecting the position of an objective lens holding member arranged as opposed to this sensor and enclosed with the above mentioned permanent magnets is formed so that the vibration of the objective lens may be prevented by the output of this position detecting means from being generated at the time of starting and ending a coarse seeking.

BRIEF DESCRIPTION OF THE DRAWINGS

FIGS. 2 to 4 relate to the first embodiment of the present invention.

DETAILED DESCRIPTION OF PREFERRED EMBODIMENTS

Figure 3:
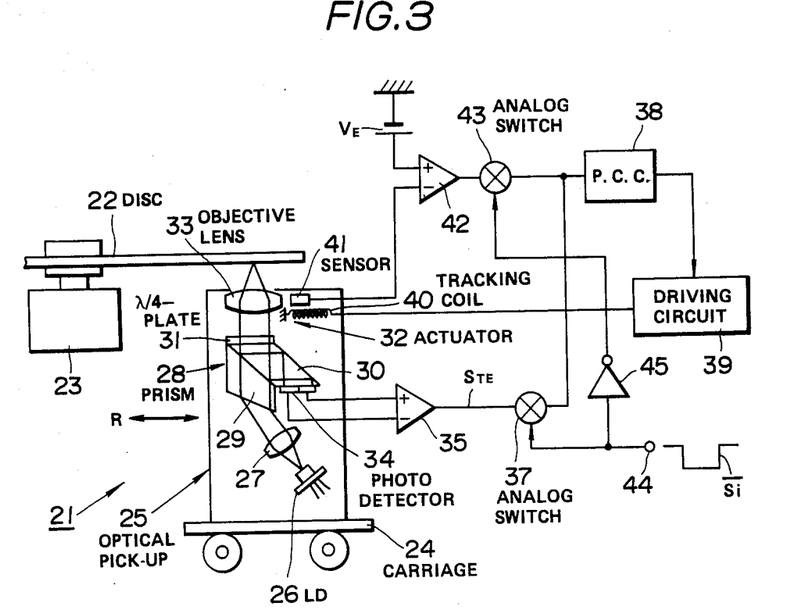
FIG. 3 is a formation diagram showing a schematic formation of the first embodiment.

As shown in FIG. 3, in an optical information recording and/or reproducing apparatus 21 of the first embodiment, a disc-shaped recording medium (disc) 22 can be fitted to a rotary shaft of a spindle motor 23 through a rotatable clamping means.

An optical pickup 25 is fitted to a carriage 24 movable in the radial direction R perpendicular with recording tracks of the disc 22 as opposed to one recording surface of the above mentioned disc 22. In the case of a coarse seeking, this carriage 24 is moved in the radial direction R by such as a feed motor not illustrated.

Figure 2:
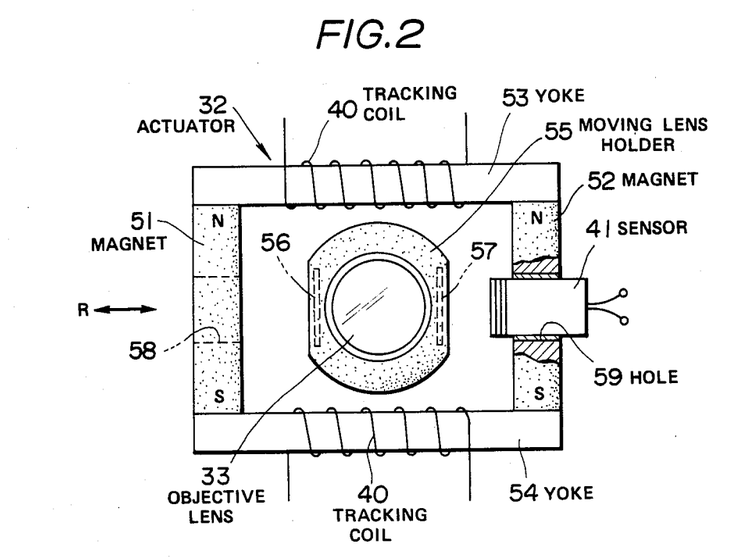
FIG. 2 is a schematic elevation showing the structure of an actuator used in the first embodiment.

The above mentioned optical pickup 25 is provided with a semiconductor laser 26 as a light source so that such light emitted by this semiconductor laser 26 as, for example, a P-polarized light is made parallel beams by a collimating lens 27 and the beams are shaped to be of a circle in which the shape of the expansion of the beams is elliptic by a shaping and polarizing prism 29 in an integral prism 28 having shaping, polarizing and critical angle detecting parts, are passed through a polarizing prism 30 and λ/4-plate 31 to be circularly polarized and are collected and projected in the form of a spot onto the disc 22 surface by an objective lens 33 forming an actuator (objective lens driver) shown in FIG. 2. The beams reflected by the above mentioned disc 22 surface are passed against through the objective lens 33 and λ/4-plate 31 to be S-polarized to intersect rectangularly with the going way, are made to enter the polarizing prism 30, are then reflected, have the critical angle detected and are made to enter a photodetector 34 which is formed of a 4-divided photodiode to make a tracking detection, focus detection and RF detection.

In the above mentioned tracking detection (vertical to the paper surface), a tracking error signal $S_{TE}$ is obtained by a difference signal output passed through a differential amplifier 35 of the divisions arranged symmetrically above and below (vertically to the paper surface), is put into a phase compensating circuit 38 through an analog switch 37 to have the phase corrected and is then impressed on a tracking (driving) coil 40 through a driving circuit 39. By the driving signal impressed on this tracking coil 40, the objective lens 33 can be moved in the radial direction R of the disc 22.

Now, as shown in FIG. 2, in the actuator 32 in the first embodiment, a position sensor 41 is provided as a detecting means for holding the objective lens 33 in a predetermined position. The output of this position sensor 41 is impressed on one input end of a differential amplifier 42 and is compared with a reference potential level $V_E$ impressed on the other input end of this differential amplifier 42 and this compared output is put into the above mentioned phase compensating circuit 38 through an analog switch 43.

When, for example, a high level voltage is impressed on the respective control ends of both analog switches 37 and 43 mentioned above, their input and output ends will conduct with each other, an indicating signal Si from an indicating signal terminal 44 will be impressed on the control end of one analog switch 37 and the indicating signal Si inverted through an inverter 45 will be impressed on the control end of the other analog switch 43.

For the above mentioned indicating signal Si is used a signal obtained by inverting a control signal making a coarse seeking in the case of seeking a track. When this low level indicating signal Si is impressed, the analog switch 43 will conduct (will be on), the output of the position sensor 41 will be compared with the reference level $V_E$, a controlling driving current will flow through the tracking coils 40 on the basis of the output compared with this reference level and a controlling function holding the objective lens 33 in a predetermined position will act. In this state, the analog switch 37 for the tracking servo-mechanism will be held in a nonconducting (off) state.

On the other hand, when the above mentioned indicating signal Si is on a high level, the on-off states of the analog switches 37 and 43 will be reversed.

(By the way, when the tracking servo-mechanism is on, the indicating signal Si will be on a high level.)

Now, the actuator 32 used in the above mentioned first embodiment is of a structure shown in FIG. 2.

As disclosed, for example, in U.S. Pat. No. 4,419,614, bar-shaped permanent magnets 51 and 52 magnetically showing the same characteristics are parallelly arranged as opposed to each other to be in the same magnetizing direction and yokes 53 and 54 are parallelly arranged in the direction intersecting rectangularly with the pair of permanent magnets 51 and 52 so as to short-circuit the respective magnetic poles of the same polarity of the permanent magnets 51 and 52 to form a closed magnetic circuit of a rectangular shape with the permanent magnets 51 and 52 and yokes 53 and 54 as respective four sides. The respective yokes 53 and 54 are wound with tracking coils 40.

In the center of the space inside the above mentioned closed magnetic circuit, a movable lens holder 55 formed to be substantially ring-shaped of a magnetic material of a high permeability is fitted to one end part (upper end part) of each of parallel plate springs 56 and 57 erected in the direction vertical to the paper surface so as to be movable in the direction perpendicular to the plate surface, that is, in the radial direction represented by the symbol R in FIG. 2 by a force against the energizing force of these plate springs 56 and 57. The objective lens 33 is fitted through a frame inside the movable lens holder 55.

The outer peripheral parts opposed to the respective permanent magnets 51 and 52 in the above mentioned movable lens holder 55 are somewhat cut off so as to be parallel with the tip surface of the sensor 41 for the ease of the position detection. Through holes 58 and 59 are formed respectively in the middles of the lengthwise directions of both permanent magnets 51 and 52. The position sensor 41 is fitted in one through hole 59 through a spacer. (The above mentioned cuts are not always necessary.)

The actuator 32 of the above mentioned structure is formed by arranging the ring-shaped movable lens holder 55 of a high permeability in the central part inside the closed magnetic circuit formed of the permanent magnets 51 and 52 and yokes 53 and 54 so that the magnetic fluxes emitted out of both permanent magnets 51 and 52 will pass through the movable lens holder 55 and yoke 54 from the substantially middle part in the lengthwise direction of the yoke 53 and will return to the respective permanent magnets 51 and 52 sides. The magnetic flux leaking in the radial direction R is so slight that the influence of providing the sensor (on the inherent function of the actuator) will be little.

When an electric current is passed through the above mentioned tracking coils 40, the magnetic flux passing between both yokes 53 and 54 will incline in the radial direction R, therefore the movable member 55 will be moved in the radial direction R toward the larger magnetic flux against the energizing force of the plate springs 56 and 57 so that a close seeking or tracking servo-operation may be made.

As the above mentioned position sensor 41 is to be fitted in the through hole 59 made in the permanent magnet 52, a sensor of a shape larger than in the case of providing the sensor on the inside surface of the permanent magnet can be used and therefore the sensing sensitivity can be improved.

Also, by fitting and moving the sensor within the through hole 59, the sensor can be easily adjusted to be in the best condition. By fixing the sensor in the best condition, the function of the sensor can be developed to be maximum. Also, in such case, even if the sensor 41 or actuator 32 fluctuates, it will be able to be covered by adjusting the moving and fitting position of the sensor 41.

By the way, the through hole 58 made on the permanent magnet 51 side is to prevent the through hole 59 made in the permanent magnet 52 to fit the sensor 41 from becoming assymmetrical on the right and left. A member showing the same magnetical characteristics as of the sensor 41 may be fixed in this through hole 58 for further improvement.

The operation of the thus formed first embodiment shall be explained in the following.

In case a track is to be sought, whether the difference between the track required to be moved and the track before being moved is of a size required to be coarsely sought or not is judged and, when it is judged to be coarsely sought, a signal pulse matching the number of tracks required to be moved will be given to the feed motor moving the entire optical pickup 25 and a coarse seeking moving the carriage 24 will be made by this signal pulse. In this case, before the above mentioned signal pulse is given to the feed motor, an indicating signal Si on a low level will be formed by the signal of the above mentioned judgment and will be impressed on the terminal 44, the analogue switch 43 will be set on and a position controlling loop in which the position of the objective lens 33 is controlled by the output of the position sensor 41 will operate.

Figure 4:
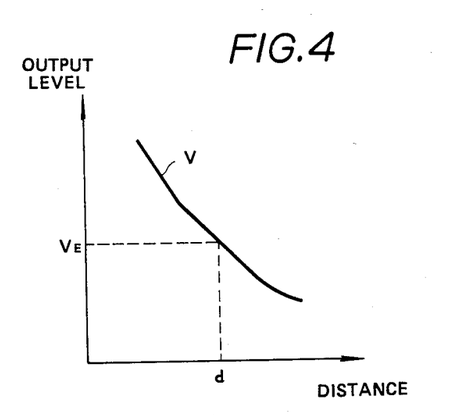
FIG. 4 is a characteristic diagram showing output characteristics against the distance of a position sensor.

Therefore, after this loop operates, when a coarse seeking is made, the carriage 24 is moved and an acceleration acts on the pickup 25, the movable lens holder 55 supported by the plate springs 56 and 57 will move in the direction reverse to the moving direction of the carriage 24. Therefore, for example, if the movable lens holder 55 moves to the sensor 41 side and, in this case, if the input and output (the input being a distance and the ouput being an output level) of the position sensor 41 are of such characteristics as are shown in FIG. 4, the output level V of the position sensor 41 will become larger than the reference level $V_E$ impressed on the other input end of the differential amplifier 42 (In the above mentioned input and output characteristics, at the time of the reference level $V_E$, the distance d, that is, the distance between the tip of the sensor 41 and the cut surface of the movable lens holder 55 will be so set that the movable lens holder 55 will be in an equilibrium position. This can be realized, for example, by adjusting the reference level $V_E$.), that is, will be so nearer than the equilibrium position that the output of the differential amplifier 42 will be negative (in FIG. 3). The direction of the current flowing through the tracking coils 40 through the driving circuit 39 by this output will form a magnetic flux in the direction forcing the movable lens holder 55 away from the sensor 41 (that is to say, the greater part of the magnetic flux will be made on the left side of the equilibrium state in FIG. 2), will prevent the movement of the above mentioned movable lens holder 55 and will act to hold the movable lens holder 55 so as not to deviate from the equilibrium position. By the way, even in case the movable lens holder 55 is moved in the direction separating from the sensor 41, the movable lens holder will be controlled by the controlling loop so as to be prevented from such movement. That is to say, by the above mentioned position controlling loop, the movable lens holder 55 will be controlled to be held in the equilibrium position and will be regulated to produce no vibration in case the pickup 25 is moved and stopped.

The above mentioned controlling loop will operate during the period in which the indicating signal Si is on a low level. This indicating signal Si will move the track, for example, by the coarse seeking. In case it is judged by reading out the subsequent track position to successively make a close seeking, the track movement will be ended by this judging signal so that thereby the close seeking may be successively made in a vibrationless state without obstructing the close seeking. (That is to say, it is not necessary to wait for the close seeking until the vibration subsides.) In such case, if the track displacement is large in the above mentioned first coarse seeking, a coarse seeking will be made again and, in this case, the indicating signal Si will be successively held on a low level.

The above mentioned close seeking is made in a vibrationless state and therefore can be quickly completed. Also, as three is no vibration, after the track position is read out, until the tracking servo-mechanism is operated, the displacement will be able to be dissolved.

By the way, in the case of a close seeking, the position controlling loop will be open not to operate. Therefore, in case the tracking servo-mechanism is open, as different from the above described related art example in which the position control is always made, a close seeking will be able to be made without any trouble and a simple circuit formation will be able to be realized.

Further, in the first embodiment, there can be used such sensor 41 wherein, near the distance for the equilibrium position, the output level varies with the distance variation, the linearity is little required, therefore a low cost sensor can be used and a sensor in a wide range can be selected (by noting a high sensitivity) without being restricted to the linearity. (By the way, various known position sensors can be used for the above mentioned sensor.)

Further, by making the gain of the differential amplifier 42 large, the movable lens holder 55 can be supported substantially rigidly in the equilibrium position. The unnecessary vibration produced at the time of starting and stopping the movement of the carriage 24 can be well suppressed.

Figure 5:
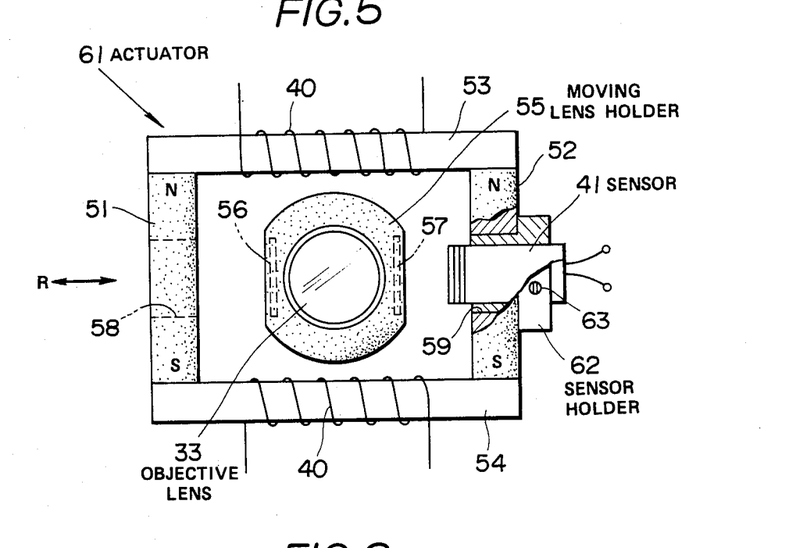
FIG. 5 is a schematic elevation showing the structure of an actuator in the second embodiment of the present invention.

FIG. 5 shows an actuator 61 in the second embodiment of the present invention.

In this actuator 61, the sensor 41 is fitted through a sensor holder 62 in the through hole 59 formed in the permanent magnet 52. This sensor holder 62 is provided with a through hole or screw hole to fit and contain the sensor 41. The sensor 41 can be adjusted to be in any desired position adapted to detect the position and can be fixed with a set screw 63.

The other formation is the same as in the above mentioned first embodiment. The same reference numerals are attached to the same respective members.

Figure 6:
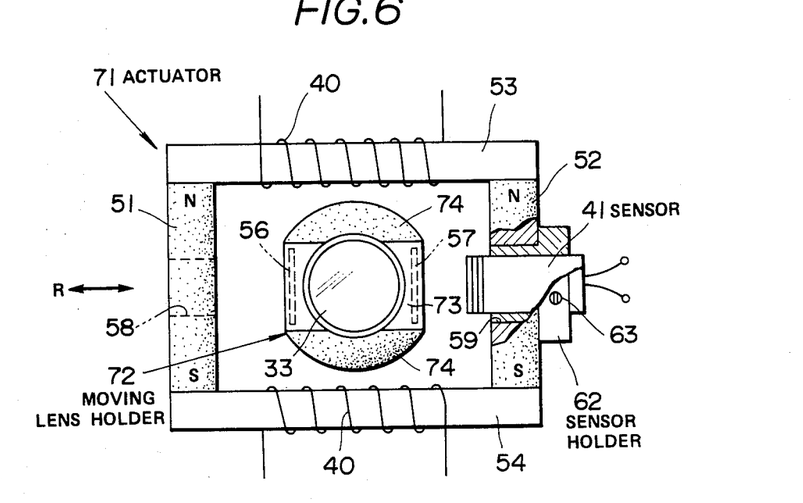
FIG. 6 is a schematic elevation showing the structure of an actuator in a modification of the second embodiment in FIG. 5.
Figure 7:
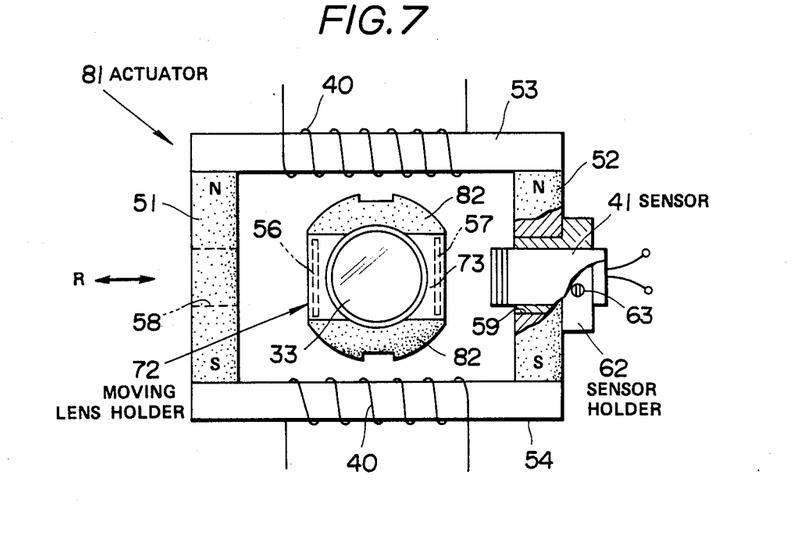
FIG. 7 is a schematic elevation showing the structure of an actuator in another modification of the second embodiment.

The actuator can be of the structure shown in FIG. 6 or 7 instead of the structure in each of the above described embodiments.

In an actuator 71 shown in FIG. 6, a movable lens holder 72 to be fitted with the objective lens 33 is formed of a nonmagnetic member 73 and magnetic members 74.

The contour of the above mentioned movable lens holder 72 is the same as, for example, in the second embodiment but the parts adjacent to the yokes 53 and 54 are formed respectively of magnetic members 74 of a high permeability and the central part is made of the nonmagnetic member 73.

In this case, the magnetic flux will leak out mostly on the periphery of the position sensor 41 and therefore such magnetoelectric conversion type sensor as, for example, a hole element or eddy current detecting type sensor will be able to be used for the position sensor 41. Needless to say, such other sensor as, for example, an electrostatic capacitance system or any other sensor may be used as in the other embodiments.

In an actuator 81 shown in FIG. 7, in magnetic members 82, a recess is formed in the middle of each of the parts adjacent to the yokes 53 and 54 in the magnetic members 74 shown in FIG. 6. The other parts are of the same structure as is shown in FIG. 6.

Figure 8:
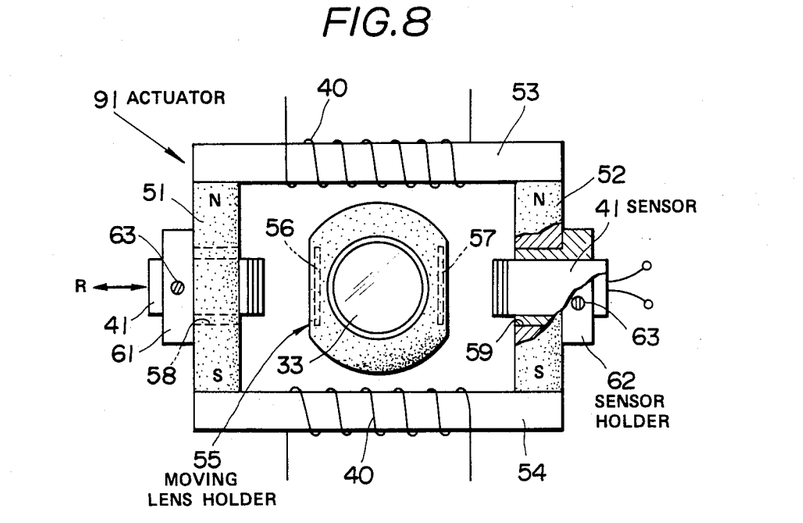
FIG. 8 is a schematic elevation showing the structure of an actuator in the third embodiment of the present invention.

By the way, as in an actuator 91 in the third embodiment shown in FIG. 8, the sensor 41 in the above mentioned second embodiment may be provided also on the other permanent magnet 51 side so as to detect the position with their differential output. Thereby, the influence of the unnecessary magnetic flux on the sensor 41 in case the detection sensitivity is different depending on the temperature or in the case of a magnetoelectric type can be reduced.

Also, the position in the radial direction R of the objective lens 33 can be detected by using both position sensors 41 in the actuator 91 shown in the above mentioned FIG. 8. In such case, the sensors 41 of a favorable linearity are preferable.

Now, in the above mentioned first embodiment, the position control is operated from the time of starting (just before) the coarse seeking to the time of ending it (to some time after the end) but is to be operated preferably over the time (moment) when the acceleration acts at least at the starting time and ending time. Therefore, at the time when the acceleration does not act or little varies in the course of the coarse seeking, the position control will not be always required but will not be disadvantageous to be operated. (In case the coarse seeking does not end for once but is repeated, the position control may be operated even in the course of the coarse seeking. Needless to say, in some track seeking method, the coarse seeking can be ended substantially for once.)

Also, except in case the tracking servo-mechanism is operated and when the close seeking is made, the above mentioned position controlling means may be operated.

By the way, in case the operation of the position controlling loop is at a high speed (in case the equilibrium position can be returned within a short time), even if the position control is operated only at the time near the ending time at the coarse seeking time, it will be able to be quickly set in the equilibrium position and therefore the successive close seeking will be able to be smoothly made. When the position control is operated some time before the coarse seeking ending time, even in the case of the position control to which the response is not so quick, the position control will be able to be set in the equilibrium position near the coarse seeking ending time and the successive close seeking will be able to be smoothly made.

That is to say, the position control made in the (minute) period at least from just before the end of the coarse seeking to the ending time belongs to the present invention.

By the way, in each of the above described embodiments, the tracking coils are wound on the yokes but may be wound on the permanent magnet sides. Further, the present invention can be applied to an actuator wherein the tracking coils are wound on the lens holder side as disclosed in U.S. Pat. Nos. 4,449,213 and 4,473,274.

As described above, according to the present invention, a hole for fitting a sensor is made in a permanent magnet forming an actuator, the sensor is fitted through a holder or directly in this hole, there is provided a means of controlling the position to prevent an objective lens from being vibrated by the sensor output in case an unnecessary vibration is caused by the acceleration at the time of starting and ending a coarse seeking by the sensor and therefore, without waiting for the stop of the vibration after the coarse seeking, a close seeking can be made and a quick track seeking can be completed.

Also, the position sensor is not restricted to the linearity and sensor of a low cost and high sensitivity can be used.

It is apparent that a working mode different in a wide range can be formed without departing from the spirit and scope of the present invention. The present invention is not restricted to any specific working mode except being limited in the appended claims.

What is claimed is:

1. An optical recording and/or reproducing apparatus, comprising:
    an optical pickup having an actuator, wherein said actuator includes,
    (a) a closed magnetic circuit including permanent magnets and yokes,
    (b) a lens holder held by a resilient member in the space inside of said closed magnetic circuit and biased to a predetermined position therein for providing fine positioning of said optical pickup, wherein said lens holder has an objective lens for collecting and projecting light beams onto a disc-shaped recording medium, said lens holder being at least partly composed of a magnetic material,
    (c) tracking coils wound on said closed magnetic circuit of said lens holder such that upon energization of said coils, said lens holder is displaced in a radial direction with respect to said recording medium, and
    (d) a lens holder position detecting sensor disposed in a through hole formed in said permanent magnet or yoke of said closed magnetic circuit;
    an optical system means for projecting incident light beams onto said objective lens and for receiving reflected light beams reflected from said recording medium and back through said objective lens, and collecting and projecting said reflected light beams onto a photo-detector;
    a pickup moving means for moving said optical pickup in a radial direction with respect to said recording medium for providing coarse positioning of said optical pickup; and
    a switching means for controlling said tracking coils in response to an output of said position detecting sensor to move the position of said lens holder.

2. An optical information recording and/or reproducing apparatus according to claim 1, wherein said switching means operates to control the position of said lens holder during the beginning or the ending of the coarse positioning when said optical pickup is moved by said pickup moving means.

3. An optical information recording and/or reproducing apparatus according to claim 1, wherein said resilient member resiliently holds said lens holder in order to allow movement thereof in a radial direction with respect to said recording medium and perpendicular with respect to the optical axis of said objective lens.

4. An optical information recording and/or reproducing apparatus according to claim 1, which has a bias signal detecting means wherein the output of said sensor is compared with a reference level and a bias signal corresponding to the displacement from the reference position of said lens holder is output and a switch wherein a tracking error signal produced from a differential output of a photoelectric conversion signal of said photodetector and said bias signal are switched over and are impressed on said tracking coils.

5. An optical information recording and/or reproducing apparatus according to claim 1 wherein the permanent magnet fitted with said sensor is paired with a permanent magnet arranged in parallel with said permanent magnet so as to be directed in the polarity in the same direction and the same polarities of said pair of permanent magnets are respectively short-circuited by the yokes to form a closed magnetic circuit.

6. An optical information recording and/or reproducing apparatus according to claim 5 wherein a through hole is made also in the other permanent magnet in the position symmetrical with the fitting position of the permanent magnet fitted with said sensor.

7. An optical information recording and/or reproducing apparatus according to claim 6 wherein a member showing the same magnetic characteristics as of said sensor is fitted in the through hole on said other permanent magnet side.

8. An optical information recording and/or reproducing apparatus according to claim 5 wherein said sensors of the same characteristics are fitted in the respective symmetrical positions in said pair of permanent magnets.

9. An optical information recording and/or reproducing apparatus according to claim 1 wherein said resilient member includes a pair of parallel plate springs.

10. An optical information recording and/or reproducing apparatus according to claim 1 wherein said sensor has a fitting means capable of varying and adjusting the distance between said sensor and said lens holder.

11. An optical information recording and/or reproducing apparatus according to claim 10 wherein said fitting means uses a spacer fitted between said through hole and said sensor.

* * * * *